United States Patent [19]
Gitman

[11] Patent Number: 5,599,375
[45] Date of Patent: Feb. 4, 1997

[54] METHOD FOR ELECTRIC STEELMAKING

[75] Inventor: Gregory M. Gitman, Atlanta, Ga.

[73] Assignee: American Combustion, Inc., Norcross, Ga.

[21] Appl. No.: 336,984

[22] Filed: Nov. 10, 1994

Related U.S. Application Data

[63] Continuation-in-part of Ser. No. 297,686, Aug. 27, 1994, abandoned.

[51] Int. Cl.$^6$ ............................................. C21B 13/12
[52] U.S. Cl. ............................................. 75/10.42; 75/10.61
[58] Field of Search ............................... 75/10.42, 10.61

[56] References Cited

U.S. PATENT DOCUMENTS

| | | |
|---|---|---|
| 3,429,300 | 2/1969 | Eisentrout . |
| 3,729,285 | 4/1973 | Schwedersky .................... 431/8 |
| 3,856,457 | 12/1974 | Miller ............................ 431/353 |
| 4,147,116 | 4/1979 | Graybill ......................... 110/263 |
| 4,362,556 | 12/1982 | Kishida ......................... 75/10.42 |
| 4,422,391 | 12/1983 | Izuha et al. ................... 110/347 |
| 4,428,309 | 1/1984 | Chang et al. ................. 110/262 |
| 4,541,796 | 9/1985 | Anderson ....................... 431/187 |
| 4,622,007 | 11/1986 | Gitman .......................... 432/13 |
| 4,642,047 | 2/1987 | Gitman .......................... 432/13 |
| 4,671,765 | 6/1987 | Yih-Wan Tsai ................ 432/13 |
| 4,752,330 | 6/1988 | Gitman .......................... 75/59.19 |
| 4,797,087 | 1/1989 | Gitman .......................... 431/10 |
| 4,861,262 | 8/1989 | Gitman et al. ................. 431/5 |
| 4,865,297 | 9/1989 | Gitman .......................... 266/226 |
| 4,890,562 | 1/1990 | Gitman .......................... 110/236 |
| 5,042,964 | 8/1991 | Gitman .......................... 432/13 |

*Primary Examiner*—Melvyn Andrews
*Attorney, Agent, or Firm*—Needle & Rosenberg, P.C.

[57] ABSTRACT

A method of melting and refining metals by high-temperature impinging combustion products generated by a single or multiple oxy-fuel or fuel/oxygen/air combustors that direct a flame towards a predetermined area of scrap to be melted. Once a portion of charged scrap contacted by the flame or flames is melted, an injection of solid carbonaceous fuel is initiated, preferably through a combustion tunnel of at least one of the combustors. High velocity oxygen is directed, simultaneously with carbonaceous material, through at least one dedicated nozzle toward injected solid carbonaceous fuel to mix with this fuel and to generate CO, which is capable of forming foamy slag. Optionally, a supersonic stream or multiple streams of additional oxygen is also directed toward the iron-carbon melt to initiate rapid melt refining.

33 Claims, 8 Drawing Sheets

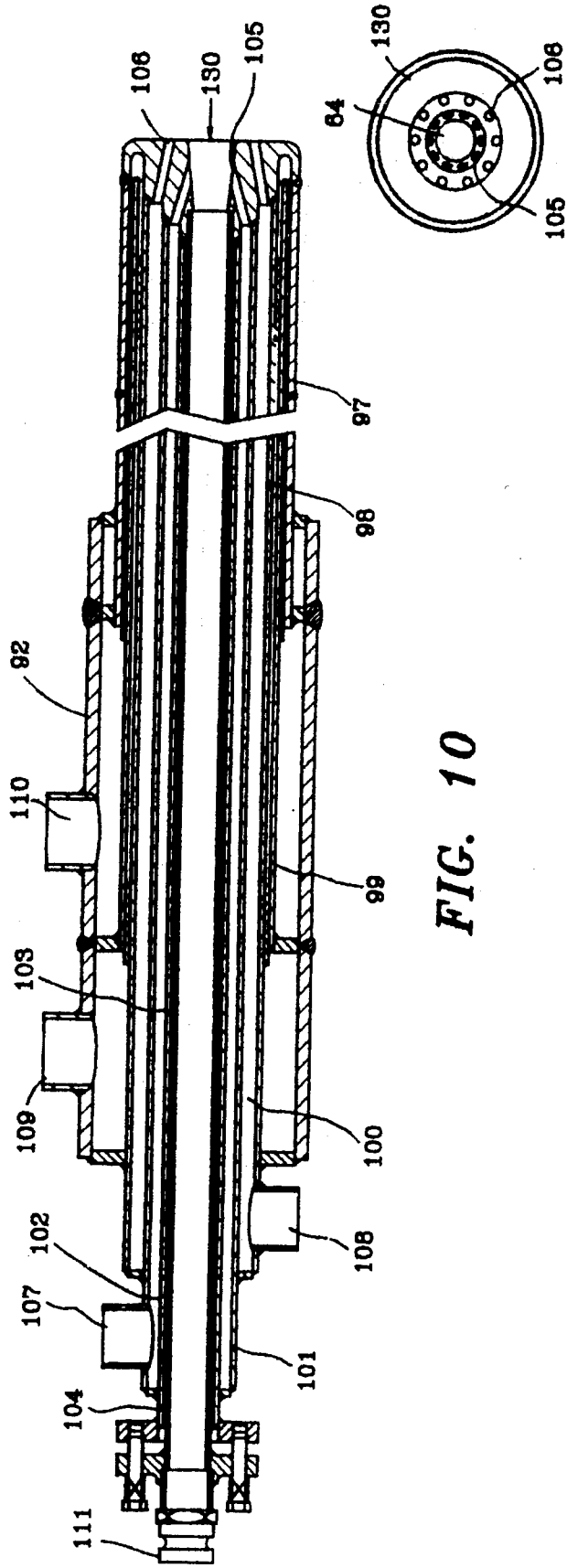

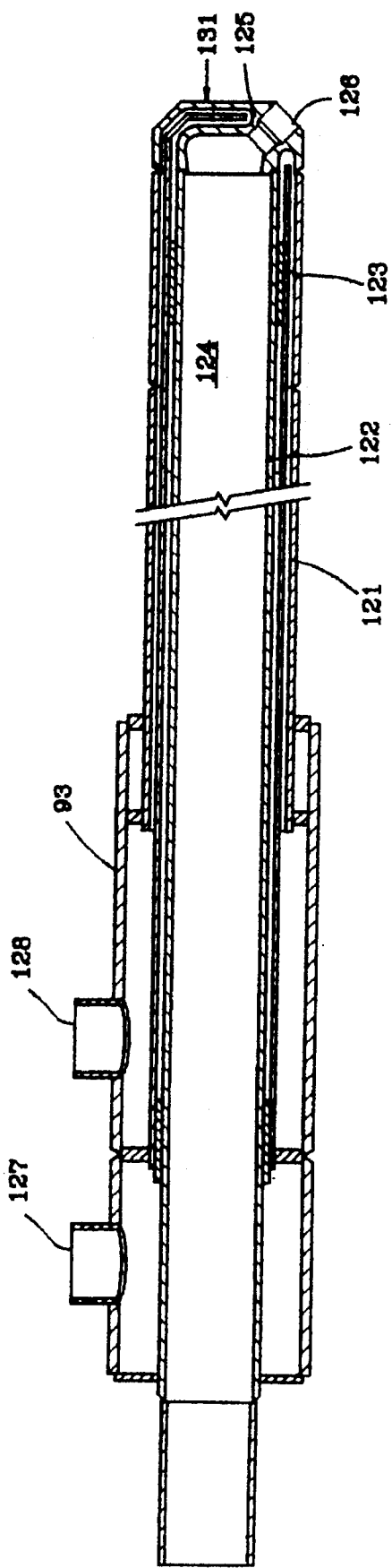
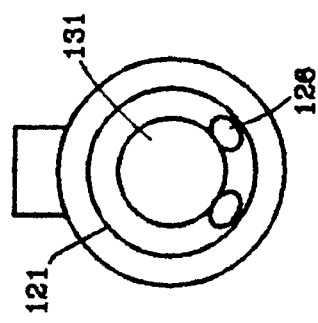
FIG. 12
FIG. 13

METHOD FOR ELECTRIC STEELMAKING

This application is a continuation-in-part of application Ser. No. 08/297,686, filed Aug. 29, 1994, entitled "Method and Apparatus for Electric Steelmaking", now abandoned.

BACKGROUND OF THE INVENTION

The present invention relates to a method and apparatus for making steel in an electric arc furnace ("EAF") equipped with an auxiliary heat source including means for introducing auxiliary fuel and oxidizing gas into the furnace for the purpose of reducing the consumption of electrical energy and increasing furnace throughput rate.

More particularly, it relates to a method of making steel in an electric arc furnace equipped with at least one burner that comprises a means for injection of solid carbonaceous fuel and/or oxygen.

Previously known methods of electric steelmaking include multiple movable or permanently fixed burners utilizing hydrocarbon fuel such as, for example, natural gas or oil, at least one movable oxygen lance for injection of a stream of oxygen toward the molten bath for refining purposes and a movable means for injecting solid carbonaceous fuel for combustion and slag foaming purposes.

When an electric arc furnace operates without burners, the charged scrap is rapidly melted at the hot spots at regions of highest electric current density. This creates harsh conditions for the water cooled furnace wall and refractory lining located at the hot spots due to excessive exposure to heat from the arc during the last part of the melt down cycle. Scrap located in the cold spots receives heat from the arc at a reduced rate during the melt down cycle, thereby continuing to protect the water cooled panels and the part of the refractory lining located at cold spots of the electric arc furnace from excessive exposure to heat at the end of the melt down cycle. This asymmetrical heat distribution from the arc and non-uniform wear of the furnace walls are typical for both alternating current and direct current arc furnaces operating without burners.

Presently known burners for electric arc steelmaking use either oxygen or a combination of oxygen and air to oxidize hydrocarbon fuel. These burners are preferably installed at the colder spots of the furnace to primarily provide auxiliary heat during scrap melting in order to make the melting pattern more uniform.

Cold spots are typically formed in areas further away from the furnace arc as scrap located in these areas receives electrical energy at a reduced rate per ton of scrap. A typical example of such a cold spot is the tapping spout, due to its location away from the arc. Another cold spot occurs at the slag door due to excessive heat losses to ambient air infiltrated through this area. It is common for furnaces utilizing additional injection of materials, such as slag forming material, direct reduced iron, etc., (which is carded out through the slag door or through an opening in the furnace side wall) to create cold spots due to localized charging of additional heat consuming materials during the melt down cycle. Thus, a portion of the working volume of the furnace at the cold spots is continuously occupied with build-ups that are melted only at the end of the melt down cycle or that remain unmelted at the end of the melt down cycle when the furnace has reached its highest temperature. These build-ups reduce the working volume available for scrap to be charged and, therefore, reduce furnace throughput capacity.

Electric arc furnaces equipped with burners located at cold spots provide improved uniformity of scrap melting and reduce build-ups of materials at the cold spots. When auxiliary heat sources such as burners are placed in the electric arc furnace, their location is chosen to avoid further overheating of hot spots resulting from the rapid melting of scrap located between the electrode and the furnace shell. More specifically, the burners are located as far away from hot spots as is practically possible and the burner flame outlet opening direction is chosen so that flame penetration occurs predominantly into the scrap pile located at the cold spots.

The same philosophy is used to select the location of other additional auxiliary heat sources including oxygen injection lances. When additional lances are located at the cold spot(s), the exothermic energy of melt refining can be used more effectively to melt the scrap without overheating of the hot spots.

Injection of oxygen for melt decarburization is accomplished by one or more movable devices such as submerged, consumable oxygen pipes and/or by one or more water-cooled non-submerged oxygen lances. During operation of the water-cooled lance, the lance is first introduced into the furnace, then gradually moved to the position in which the lance discharge opening or openings for the introduction of oxygen are located, preferably approximately 150–300 mm or more above the bath. The discharge velocity of the oxygen stream from the water-cooled lance is to be chosen to allow the stream of oxygen introduced by the lance located in the above working position to penetrate the slag and to react with the iron-carbon melt without molten metal splashing on the furnace walls and electrode(s).

The slag door is the largest opening commonly used for introduction of additional chemical energy of fuels into the furnace via burner means and carbon injection means. Unfortunately, opening the slag door results in a substantial infiltration of cold ambient air into the furnace, and the slag door is typically located further away from the electrode(s) than the furnace shell. This ambient air infiltration at a distance from the electrode(s) results in a lengthening of the time needed to melt scrap at the slag door when no auxiliary heat source is operated at the cold spot near the slag door.

Combined injection of carbon and oxygen via the dedicated lances through the slag door has become a common practice for adding extra heat to the process. An additional heat source is created by the oxidation of injected carbon with injected oxygen near the cold spot at the slag door. Carbon and oxygen are typically injected by a door lance using a lance manipulator to position oxygen and carbon injection lances through the slag door by remote control. These oxygen and carbon injection lances are usually held by a common carrying arm, so that their position is fixed relative to each other during manipulation. The supply of controllable carbon flow for injection is obtained from a carbonaceous material dispenser by a compressed gaseous carrier such as compressed air, natural gas, nitrogen, etc.

The use of the burners together with carbon and oxygen lances has allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer that insulates the electric arc from heat losses. The foamy slag also stabilizes the electric arc and therefore allows for a higher electrical power input rate. The foamy slag layer is created by CO bubbles which are formed by the oxidation of injected carbon to CO. However, these improvements are achieved at the expense of creating a negative environmental impact due to the emission of CO.

The increased flow of injected carbon creates increased localized CO generation. Mixing of the CO with oxygen inside of the electric arc furnace is desirable but very difficult to arrange without excessive oxidation of the slag and electrodes. Although the single point of carbon injection provides localized heat release capable of increasing the temperature at a local cold spot and of improving furnace thermal efficiency, the rate of carbon injection is typically kept relatively low, due to the limited capability for dissipating the locally released heat and the limited ability of the locally generated CO stream to react with the additional oxygen stream creating environmentally acceptable $CO_2$ prior to being exhausted out of the furnace.

The most modem electric arc furnaces are equipped with all or some of the above mentioned means for auxiliary heat input. Each auxiliary heat source plays its dedicated role to provide for additional heat input during a predetermined period of the steelmaking cycle and at the predetermined cold spot area affected by the positioning of each device.

With the development of the burner modifications capable of withstanding molten steel and slag splashing (U.S. Pat. No. 4,622,007; Re. 33,464), the use of multiple auxiliary burners positioned at the cold spots has become a common practice. These burners can also provide oxygen injection to cut pieces of heavy scrap located at the cold spots and to assist the slag foaming process.

A substantial increase in the use of oxygen for natural gas and carbon combustion in the electric arc furnace has resulted in reduced metallic yield due to excessive oxidation of scrap with injected oxygen. A portion of the FeO produced by the oxidation of scrap during the scrap melt down cycle is reduced back by reaction with carbon present in the slag. The reducing reaction of carbon and FeO is endothermic and therefore requires heat; thus, it can be effectively carded out only in hot slag containing particles of carbon which are well distributed in the slag. The reaction creates CO which bubbles through the slag forming a foamy slag layer.

Several known steelmaking methods that provide multiple point oxygen injection during the melt down cycle are based on the use of modified burners capable of high velocity oxygen injection following the burner firing cycle. (U.S. Pat. Nos. 4,622,007; 4,752,330). These methods use the burner flames to establish empty space in the scrap pile adjacent to the burner nozzle and to establish a pool of molten iron-carbon melt on the bottom of the furnace by the partial melting of scrap at the cold spots. After the empty space and pool of molten iron-carbon melt is established, the dedicated burner or burners initiate high velocity oxygen injection throughout the empty space toward the iron-carbon melt. The reaction of the injected oxygen with carbon in the melt or carbon in the slag results in rapid foamy slag formation. To establish the presence of solid carbon particles prior to the end of the scrap melt down cycle, the solid carbon may be previously charged into the furnace. When charged carbon reacts with injected oxygen, the foamy slag is rapidly formed in the areas affected by the injection of oxygen through the burners. Unfortunately, attempts to continually charge carbon prior to the end of the burner firing cycle by using known methods of carbon charging (with the scrap, through the hole in the furnace roof or through the slag door) have not been very successful because the charged carbon is quickly burned or carried out by the combustion products generated by the burners, creating a high level of CO emissions. On the other hand, earlier initiation of carbon injection through the slag door is not effective in creating a satisfactory foamy slag in other cold spot areas located far away from the slag door due to the presence of substantial amounts of unmolten scrap in the furnace. Unmolten scrap at the slag door blocks the penetration of injected carbon into the furnace.

Therefore, there is a need for a method and apparatus capable of generating foamy slag by combined carbon and oxygen injection during the early stage of the scrap melting cycle in the area or areas affected by heat input of the burners. This combined injection should be initiated after a substantial portion of scrap charged in this area or areas is molten and after an empty space suitable for carbon injection on the top of the iron-carbon melt is formed by the burners.

To provide for rapid and efficient melting of scrap, electric arc furnace burners utilize a highly concentrated oxidizing gas containing oxygen or a combination of oxygen and air. The excess oxygen, when introduced by the burners will react with scrap which has been heated by the burner flame.

Furthermore, it is considered advisable in many cases to introduce excess (i.e., above the stoichiometric ratio) amounts of oxygen through the burner to minimize incomplete combustion of fuel and to oxidize combustibles (e.g., oil, paint, plastics, etc.) charged with the scrap. Some known methods (U.S. Pat. No. 4,622,007, Re. 33,464) purposely use excessive oxygen to enhance hot scrap cutting to speed the scrap melting and to accelerate the rate at which the residual hot heavy scrap is submerged into the iron-carbon melt and, thus, to increase electric arc furnace throughput capacity and thermal efficiency. During the early stages of the melt down cycle, oxides charged with scrap and generated by the burners are mixed with the entire slag formed on the top of iron-carbon melt located near the burner locations. Therefore, it would be advantageous to inject small carbon particles into the slag layer near the burner locations and to provide heat to these spots to reduce iron oxides back to Fe. It would also be advantageous to use this of iron-oxide reduction with carbon to foam slag earlier during the melt down cycle when a substantial amount of scrap has not yet melted around the slag door and when foamy slag generated at the slag door area has not yet fully penetrated into the furnace to provide for good insulation of the electric arc.

The use of burners for melting scrap at the furnace slag door during the early part of the melt down cycle is necessary to establish an empty space and a hot environment prior to the initiation of combined oxygen/carbon injection for the purpose of forming foamy slag as early as possible. If oxygen and carbon are injected through the slag door too early or without burner assistance, the injected carbon cannot reach and/or react with the iron-carbon melt due to the presence of the cold scrap at the slag door. Under cold conditions, injected carbon primarily reacts with injected oxygen, forming CO, which then is exhausted from the furnace, generating a negative environmental impact instead of participating in the formation of foamy slag and in the reduction of FeO.

The firing of a movable burner at the slag door prior to the introduction of movable lance or lances into the furnace helps to melt scrap at the door, which allows more efficient use of carbon and oxygen injection by the door lances. However, rapid scrap melting at the slag door area also results in a very significant increase in the flow of ambient air infiltrating into the furnace. An increased volume of infiltrated air leads to an increased mass of nitrogen oxides (NO$_x$) being generated inside the hot spots formed by the electric arc before foamy slag has been formed to submerge the arc and protect the extremely high temperature are region from contact with infiltrated air.

Therefore, there is a need for a method and apparatus capable of generating foamy slag in the electric arc furnace through the use of localized solid carbon and oxygen injection while simultaneously minimizing ambient air infiltration through the slag door.

The basic (as opposed to acidic) slag forming material(s) such as burnt lime, dolomitic lime, etc., are typically charged with the scrap or injected through an opening in the furnace wall. These materials are not well distributed and dissolved in the slag located at the areas affected by burners that have created empty space by melting a part of the scrap. To improve metallurgical characteristics of the slag being formed during the initial stage of scrap melting at the areas located near the burners, it is preferable to provide a method and apparatus for localized introduction of basic slag forming material at or near these areas. An empty space formed after the scrap is partially melted by the burners provides suitable conditions for localized injection of basic slag forming material, which improves foamy slag formation and permits earlier initiation of iron-carbon desulphurizing and dephosphorizing processes. Therefore, there is a need for a method and apparatus for localized introduction of basic slag forming material at the spots, assisted by the burners.

The oxidizing reactions between solid carbon and oxygen and/or solid carbon and molten oxides generates CO which is partially oxidized to $CO_2$ when mixed with oxygen at high temperature conditions inside the furnace. When this reaction occurs under conditions permitting the heat released by the post-combustion of CO to be efficiently transferred to the scrap to be melted or to the iron-carbon melt, the furnace throughput capacity and thermal efficiency is increased. Therefore, the need exists to provide for localized post-combustion of CO with an oxidizing gas which is introduced in areas where the CO concentration is substantially higher than the average CO concentration in the furnace exhaust gases.

During the EAF operation, a substantial volume of the slag is accumulated on the side walls providing the insulating layer that protects the wall surface from being overheated by the arc. Keeping slag on the side walls is especially beneficial for the panels located at the hot spots of the furnace. This desirable build-up of slag on the furnace side walls makes it necessary to use movable burners and devices for oxygen and solid material injection that are designed to operate through the open slag door and/or through the openings located in the EAF roof or in the top part of the side panel. The location of these openings avoids the problem of openings plugging with the slag, since only a limited volume of slag is splashed in the vicinity of these locations. When movable burners or lances are used, they are located in areas visible from the operating room so that the furnace operator can observe the movement of the devices. Unfortunately, this limits the use of the devices and increase the cost of the installation. During the last several years, new burners have been introduced that can be permanently installed in the lower part of the side panel and near the slag line, and that are capable of protecting themselves from plugging with slag. This has significantly improved the performance of the burners and led to an increase in the number of burners utilized in the furnaces. The presence of multiple burners located in multiple points of the EAF side walls close to the slag layers and iron-carbon melt can potentially be used to expand the burner functions by making them responsible for carbonaceous fuel injection combined with oxygen injection for foamy slag formation, iron-carbon melt refining, and CO post-combustion purposes.

Therefore, there is a need for a method and apparatus for combined oxygen and carbonaceous fuel injection that can be permanently installed in the water-cooled panel of the EAF, preferably close to the slag line, and for such an apparatus that can operate without movement and without the use of expensive moving mechanisms.

The increased utilization of solid carbonaceous fuel and oxygen in electric arc furnaces and the use of steel scrap containing plastic, paint, oil and other carbon bearing materials has led to an increase in carbon monoxide and hazardous hydrocarbon generated during the scrap melting cycle of the electric are steelmaking process. At the same time, in order to produce high quality steel and to minimize metallic impurities inputted by scrap, electric arc furnace shops have increased utilization of solid pig iron, iron scrap, direct reduced iron, iron carbide and other ferrous materials having high carbon content. After these ferrous materials are melted down, the melt is refined to oxidize carbon and other impurities in the iron-carbon melt. This oxidation of carbon generates hot CO emission from the molten bath.

Modem electric arc furnaces are equipped with a means to post-combust CO in the furnace exhaust gases by the use of ambient air inspirated through the break-flange connecting the electric arc furnace with the air pollution control system and by the use of a combustion chamber located downstream of the electric arc furnace. This combustion chamber is designed to provide for the additional residence time and the mixing needed for the reaction of CO with ambient air which has been inspirated upstream of the combustion chamber but down stream of the furnace break-flange.

To reduce the levels of CO and hazardous hydrocarbon to environmentally desired standards, the post-combustion of CO should be performed within and downstream of the electric arc furnace. Post-combustion of CO in the electric arc furnace is most beneficial when the heat released by oxidation of CO to $CO_2$ is efficiently transferred to the scrap and to the melt. This results in the reduction of electrical energy consumption and/or in an increase in the furnace production rate.

During the initial, cold phase of the scrap melting cycle, the scrap pile located at the slag door blocks ambient air infiltration into the furnace and therefore into the areas where the heat is inputted by the arc and by the auxiliary burners (when burners are used to add auxiliary heat to the scrap melting process). The lack of oxygen in high temperature spots where initial CO and hazardous hydrocarbons are formed (by volatizing and incomplete combustion of charged hydrocarbons and carbon containing materials) prevents oxidation to $CO_2$ of the hot CO generated in these spots. This formed CO is exhausted away from the furnace by the suction created at the break-flange of the exhaust elbow of the furnace by exhaust fan of the air pollution control system. CO, unburned hydrocarbons and oxygen contained in infiltrated air mix and partially react in the narrow conduit formed by the exhaust elbow located downstream of the furnace and upstream of the break-flange. However, due to the low temperature of exhaust gases during the initial cold phase of scrap melting and very short retention time, substantial quantities of CO and unburned hydrocarbons survive exhaust elbow mixing and arrive at the break-flange of the electric arc furnace. The break-flange is used to connect the furnace exhaust elbow and the exhaust duct and comprises an inspirating gap which provides for inspiration of additional secondary ambient air into the exhaust gases evacuated from the furnace. When this additional inspirated air is mixed with cold exhaust gases during the initial cold phase of scrap melting, this mixing results in further reduction of the exhaust gas temperature. This colder exhaust then travels into the combustion chamber which provides for additional mixing and retention time. Unfortunately, this additional retention time can not ensure completion of CO post-combustion in the low temperature exhaust gases prior to flue gas emission into the atmosphere. Therefore, it is desirable to raise the temperature of the exhaust gases reaching the combustion chamber by reducing the inspirating gap during the initial stage of scrap melting and/or by the firing of additional burners into the combustion chamber to raise the flue gas temperature to insure ignition of the CO and unburned hydrocarbons.

During the hot phase of melt refining, a substantial amount of CO is emitted from the bath. A substantial amount of CO is also emitted from the carbon containing slag, especially when foamy slag practice is used in the electric arc furnace utilizing solid carbonaceous particles injection. During these periods of increased CO emissions, it is advisable to maximize the amount of ambient air inspirated at the break flange. However, this maximum amount of ambient air can periodically be insufficient to provide adequate oxygen to complete CO oxidation during peaks of CO emissions. Therefore, the need exists to provide for additional injection of oxidizing gas into the furnace and/or into the combustion chamber downstream of the electric arc furnace to post-combust CO generated during the hot phase of the steelmaking process.

The known methods of electric arc furnace steelmaking use the slag door to introduce multiple movable lances for the injection into the process of oxygen and solid carbonaceous particles as well as for the introduction of a burner flame to melt the scrap near the slag door. Also known is the injection and/or batch charging of basic slag forming materials and slag enhancers through the slag door and the injection of additional oxygen via a movable oxygen injecting lance through the slag door for the purpose of CO post-combustion. All the above technologies use multiple manual and/or automated movable lances that are moved into the furnace and removed during the steelmaking cycle.

When ambient air infiltrated in the furnace passes through the hot spots located near the arc or mixes with the high temperature flames generated by oxy-fuel burners, nitrogen and oxygen of the air react under such conditions to form nitrogen oxides ($NO_x$), comprised primarily of NO. NO further partially reacts with CO, volatized hydrocarbons and soot particles so that the total amount of NO is reduced before the exhaust gases leave the electric arc furnace. When the exhaust gases pass through the combustion chamber during the hot phase of the steelmaking cycle, the reaction between nitrogen and oxygen can be triggered inside of the hot spots created by the hot flames or by streams of highly concentrated oxidizing gas injected for the purpose of CO post-combustion located inside the combustion chamber interior. This may increase $NO_x$ emission from electric arc facilities. Therefore, there is a need to minimize NO emission from electric arc furnaces while utilizing high temperature times and/or oxygen injection in the furnace and in the furnace combustion chamber.

The slag door of the furnace is the most accessible opening existing in the electric arc furnace for the introduction of movable lance(s) and burning means. Known apparatuses for carbon injection, lime injection and oxygen injection comprise multiple, separately movable water-cooled lances and/or consumable pipe-lances that are submerged into the melt. The burner(s) and the multiple lances are introduced utilizing multiple movement mechanisms through the slag door during different periods of the steelmaking cycle to provide for various steelmaking process inputs. The use of multiple lances and/or burner(s) makes it difficult and expensive to carry out automatic and simultaneous introduction of the time, oxygen, carbon and basic slag forming material through the slag door.

Therefore, there is a need for combining the burner means, a carbon injection means, an oxygen injection means and optionally, a basic slag forming material injection means integrated via movable water-cooled lances capable of efficiently operating through the slag door during the entire steelmaking process.

When lumps of basic slag forming material, such as burnt lime, dolomite lime, raw dolomite, lime stone, etc., are charged, these materials should be well distributed inside of the furnace. Good distribution of lump carbonaceous fuel such as anthracite, coke, etc., is also important to ensure good performance of charged materials. Unfortunately, currently available apparatuses are not able to accomplish the efficient introduction and good distribution of the materials during the desired period of the steelmaking cycle. This results in an incremental use of basic slag forming material, a correspondingly increase in electrical energy usage due to the additional energy required to melt the incremental basic slag forming material, and increased CO emissions due to oxidation of the incremental solid carbonaceous fuel material. This also results in incremental use of solid carbonaceous materials which are utilized with low efficiency, but which provide additional sulfur and nitrogen input to the slag and, therefore, to the melt.

Therefore, there is a need for a method and apparatus for the introduction of lump carbonaceous fuel and basic slag forming materials and for allowing good distribution of the materials inside of the slag, thereby reducing their consumption, the sulfur and nitrogen content of the melt and the mount of electrical energy per ton of steel produced.

The continuous increase in electric arc steelmaking process productivity has been achieved in modeen furnaces by the use of more powerful arcs and by the use of additional heat sources. This increase has led to the reduction in tap-to-tap time and therefore, the time period available for the use of burners and movable slag door lances.

Therefore, there is also a need for a method and apparatus allowing for rapid scrap melting near the slag door area to provide for the earlier introduction of movable injecting means into the furnace through the slag door.

SUMMARY OF INVENTION

The present invention relates to a burner/injector means for providing a localized impingement flame for scrap heating and melting through use of a fluid fuel and a highly oxidizing gas such as oxygen or a combination of oxygen and air. The burner/injector means includes a liquid cooled combustor means for generating an impinging flame directed toward the scrap pile and a means for injecting solid carbonaceous fuel and a controllable flow of a high velocity oxidizing gas into the space previously occupied by the impinging flame or flames. Optionally, the burner/injector means can be equipped with a means for injecting other solid pines including a solid slag forming materials and/or a means for injecting additional oxidizing gas for the post-combustion of CO generated by the reaction of injected carbon and/or oxygen.

The burner/injector means can contain one or more burners equipped with a combustor means for burning fluid fuel and a means for injecting oxidizing gas, solid carbonaceous fuel, and/or solid slag forming material and/or EAF dust material. The flame (or flames) generated by each burner/injector means, each burner/injector having a single or multiple liquid cooled combustor means, is directed toward a predetermined furnace area initially occupied by the charged scrap. After at least a part of the scrap previously located in this predetermined area is melted by the time or flames formed by the combustor means, the burner/injector means initiates the step of high velocity oxidizing gas injection, preferably accompanied by solid carbonaceous material injection. Both oxidizing gas and carbonaceous material flows should preferably be directed toward the predetermined furnace area previously occupied by the scrap. Optionally, basic slag forming material such as burnt lime, lime stone, dolomitic lime, and raw dolomite be injected by the burner/injector means in approximately the same furnace region. Also, optionally, an additional stream of oxidizing gas may be injected by the burner/injector means toward approximately the same furnace region to participate in the post-combustion of CO formed by the oxidation of injected carbon by the injected oxidizing gas and/or the metallic oxides that were charged with the scrap or that were formed during the previous scrap melting step.

The burner/injector means may be arranged as a simple liquid cooled burner combustor permanently mounted through the furnace wall or roof. The combustor may be equipped with single or multiple channels for solid material injection. The burner/injector means can comprise one or more additional combustors equipped with a single or multiple channels for injection of solid material(s). Optionally, the burner/injector means may comprise one or more combustors operating in conjunction with each other and/or with a separate water-cooled injecting lance or lances providing solid material(s) and/or oxidizing gas injection. Combustors and separate injecting lances included in the burner/injector means are preferably permanently mounted through the furnace wall or the roof. Optionally, the combustors and/or the water-cooled oxidizing gaslance or lances may be equipped with a nozzle or multiple nozzles for additional injection of post-combustion oxygen. An additional, separate oxidizing gas injecting lance can be used to introduce an additional post-combustion oxygen stream toward said predetermined area to react with CO generated by the oxidation of the injected solid carbonaceous fuel.

The means for solids and oxidizing gas injection may preferably be designed as single or multiple channels located inside or attached to the liquid cooled body of the combustor. The channels are preferably arranged to inject solids so that the flame discharge opening of the liquid cooled combustion chamber initially used to shape the high velocity melting flame can later be used as an opening for introduction into the furnace of single or multiple streams of injected materials. In this case, the combustion channel provides a conduit for introduction of injected material or materials into the furnace. At the same time, the combustion chamber protects the flame discharge opening from plugging with splashed slag or metal, and also protects from plugging the outlet openings used to discharge solid material or materials.

This invention also relates to a method of melting and refining of metals by high temperature impinging combustion products generated by a single or multiple oxy-fuel or fuel/oxygen/air combustors that direct the flame toward a predetermined area of the scrap to be melted. Once a substantial portion of charged scrap contacted by the flame(s) becomes molten, an injection of solid carbonaceous fuel is initiated, preferably through the combustion chamber of at least one of the combustors. In a preferred embodiment of the invention method, the high velocity (preferably supersonic) oxygen is directed, preferably simultaneously with solid carbonaceous material, through at least one dedicated nozzle toward the injected solid carbonaceous fuel to mix with this fuel to generate CO capable of forming foamy slag. This solid carbonaceous material and high velocity oxygen may instead be injected periodically, rather than simultaneously.

The flow of injected oxidizing gas may be directed through a dedicated nozzle for oxidizing gas injection in the combustor which is performing simultaneous carbonaceous fuel injection and/or through a nozzle of another combustor that has previously fired toward the same predetermined furnace area, and/or through the nozzle of an oxidizing gas lance device external to the combustors and which is also directed toward the predetermined area.

Optionally, solid carbonaceous fuel injection and/or oxidizing gas injection can be accompanied with the injection of lime or other slag forming material directed approximately toward the same predetermined area. This lime injection should preferably occur after an initial period in which only carbon and oxidizing gas is injected, so that the cooling effect of the lime injection does not interfere with the oxidation of initially injected carbon by the flow of injected oxygen.

Optionally, an additional stream of post-combustion oxidizing gas can be injected toward CO generated by the oxidation of the injected carbon and oxygen by the same burner or by additional burners (firing toward approximately the same scrap region), or by a dedicated lance means for injection of post-combustion oxygen.

The above-described injection of solid carbonaceous material, solid slag forming material, electric arc furnace dust and/or other solid particles, the introduction of which can benefit the steelmaking process, can be accomplished through the burner/injector means. This injection of solid particles may be accomplished through the flame envelope created by simultaneous burning by the burner/injector means a flow of fluid carbonaceous fuel with one or two oxidizing gases having the same or different oxygen content.

It is thus an object of this invention to provide a burner/injector means which permits the efficient preheating and partial melting of scrap with oxy-fuel or fuel/oxygen/air flame at an early stage of the melting cycle by firing impinging flame(s) to preheat and partially melt the scrap and further to direct through the combustion chamber of the burners a high velocity stream of highly concentrated oxidizer to ignite and burn a small portion of preheated scrap.

It is a further object of this invention to provide a burner/injector means that permits the introduction of solid carbonaceous fuel toward the iron carbon melt throughout an empty volume, previously occupied by scrap at the beginning of the melting cycle, after at least a part of the scrap located in front of the combustor outlet of the burner/injector means has been melted down.

It is also an object of this invention to provide a burner/injector means that permits (after at least a part of the scrap located in front of the combustor outlet of the burner/injector means has been melted down) the introduction of high velocity oxidizing gas toward the iron-carbon melt to mix with the injected solid carbonaceous fuel in order to initiate the oxidation reaction, generating carbon monoxide and optionally to partially post-combust this carbon monoxide generating carbon dioxide.

It is a still further object of this invention to provide a burner/injector means that permits (after at least a part of the scrap located in front of the combustor means of the burner/injector means has been melted down) the injection of basic slag forming material throughout the empty volume previously occupied by the scrap and that permits the mixing of the injected slag forming material with slag that has been created, at least in part, by chemical reactions associated with the injected oxygen and/or the injected solid carbonaceous fuel.

It is also an object of the invention to provide a method and apparatus for electric arc steelmaking utilizing introduction through the furnace slag door of a high velocity hydrocarbon fluid fuel flame, oxygen-rich oxidizing gas, solid carbonaceous fuel and, optionally, basic slag forming material to assist the steelmaking process. The method and apparatus can optionally provide for post-combustion of CO and hazardous hydrocarbons emitted from the steelmaking process. The post-combustion is optionally carried out first inside of the furnace interior and/or downstream of the furnace exhaust elbow by utilizing a combination of inspirated ambient air and an additional flow of injected oxygen rich oxidizing gas, and multiple side wall burners are preferably used for melting of the scrap pile located near the electric arc furnace walls by utilizing a hydrocarbon fuel and an oxygen rich oxidizing gas having an average oxygen content in excess of 30%.

It is a further object to provide a water-cooled, movable lance means used through the slag door to melt the scrap pile located near the slag door and to inject solid carbonaceous fuel carried out by the said lance means, and further to optionally provide at least one burner means to inject solid carbonaceous fuel. The method of steelmaking may further comprise a step of multiple oxidizing gas injection toward multiple regions of the furnace interior which have been affected by the solid carbonaceous fuel injection, and an optional step of introduction of basic slag forming material by the use of the lance means and/or at least one of the burner means. The method preferably includes a step of post-combustion oxidizing gas injection by the lance means and/or at least one of the burner means to partially oxidize CO generated by the reaction of carbonaceous fuel and oxidizing gas injected inside of the furnace interior, and, in addition to the flows of post-combustion oxidizing gas delivered toward different zones of the furnace interior a controlled amount of additional oxidizing gas is optionally injected into exhaust gases downstream of the furnace. The flow of the additional oxidizing gas is controlled by the process control system and is based on the combination of process parameters actively measured and/or controlled by the process control system. At least some of the process parameters influence CO emission from the furnace and are used to establish the controllable flow of post-combustion oxidizing gas in anticipation of the level of CO emission. The process parameters may include the electrical energy introduced by electrodes, the flow of hydrocarbon fuel introduced by the burners, the mass of charged and/or injected solid carbonaceous fuel, the total amount of used oxygen, the furnace pressure, and exhaust gas characteristics, including the temperature of exhaust gases, the content of oxygen and/or CO in exhaust gases and other exhaust gases characteristics correlating to the level of hazardous emissions being discharged into the environment from the electric arc steelmaking process.

It is also desirable to introduce additional post-combustion oxidizing gas streams to the areas of the furnace that are primarily responsible for CO and volatile hydrocarbon emissions during the initial cold phase of the scrap melting process. This introduction of post-combustion oxidizing gas would provide for additional oxidation of hydrocarbons and CO near the areas where CO and volatized hydrocarbon are present at higher concentrations. To prevent oxidation of the electrodes, a localized oxygen introduction should preferably be limited to the furnace interior zones adjacent to the burners located in the side walls and through the slag door.

Optionally, when electrodes are not used during the initial scrap preheating cycle which is conducted inside of the electric furnace interior, the additional movable burner or burners can be temporarily positioned to fire through the hole(s) in the furnace roof which are used for introduction of the electrode(s) into the furnace. In this case, additional burners may operate through the furnace side walls and/or roof to provide additional heat and hot combustion products input. These combustion products can preferably include a substantial amount of excess oxygen. This excess oxygen present in the hot combustion products is preferably directed to mix with CO and volatized hydrocarbons to improve CO post-combustion inside the electric arc furnace interior. To further reduce CO content in the exhaust gases during the colder part of the scrap melting cycle, post-combustion burners and oxidizing gas lances may be installed to operate in the combustion chamber located downstream of the furnace exhaust elbow to raise the temperature of the exhaust gases and to accelerate the oxidation of CO and hazardous hydrocarbons to react with oxygen inside the combustion chamber.

BRIEF DESCRIPTION OF THE DRAWINGS

FIG. 10 shows a side cross-sectional view through the center of a fourth embodiment of a combustor of a burner/injector means.

FIG. 11 shows a front view of the combustor of FIG. 10, taken along line XI—XI of FIG. 10.

FIG. 12 shows a side cross-sectional view through the center of an auxiliary oxygen lance of the fourth embodiment of the burner/injector means in accordance with the invention and which is designed for operating through the an opening of the furnace.

FIG. 13 shows a front view of the auxiliary oxygen lance of FIG. 12.

DESCRIPTION OF PREFERRED EMBODIMENT

Preferred embodiments of the invention are now described with reference to the drawings, in which like numbers indicate like parts throughout the views.

Figure 1:
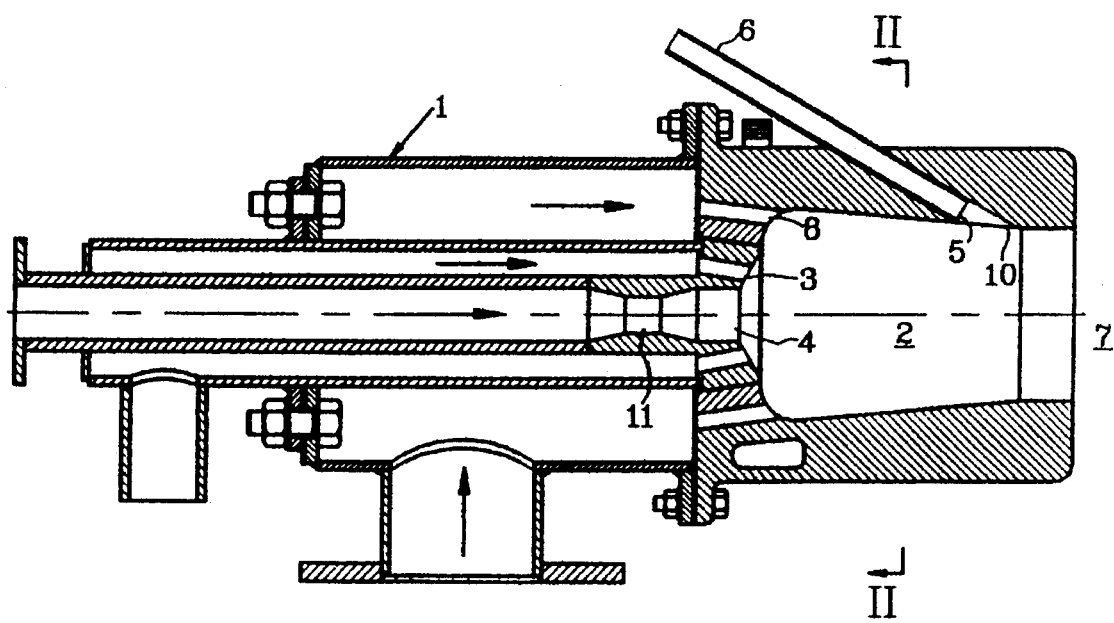
FIG. 1 shows a side cross-sectional view through the center of a first embodiment of a combustor of a burner/injector means in accordance with the invention equipped with a means for injection of solid particles.

FIG. 1 shows a first embodiment of the inventive burner/injector means, including a combustor means 1, equipped with a water-cooled combustion chamber 2, multiple openings 3 for introduction of fluid hydrocarbon fuel into the combustion chamber and an opening 4 preferably having the converging-diverging shape of a Laval nozzle for introduction into the combustion chamber of a first oxidizing for hydrocarbon fuel combustion purpose and for the purpose of high velocity (preferably supersonic) oxygen injection into the furnace throughout the combustion chamber, and at least one conduit 5 for introduction of solid material particles carried by a flow of pressurized gas into the combustion chamber through a replaceable pipe 6 having an outlet opening 10 directed toward the flame discharge opening 7 of the combustion chamber. Optional multiple openings 8 may be provided for introduction of an optional second oxidizing gas. The second oxidizing gas can have the same oxygen content as the first oxidizing gas or preferably may have lesser oxygen content. For example, the first oxidizing gas can preferably be an industrially produced oxygen (above 90% $O_2$) and the second oxidizing gas can be air or oxygen enriched air. To provide for rapid ferrous scrap melting, the average adiabatic temperature of the flame should be maintained preferably above 4000° F. To do so using hydrocarbon fuel, it is advisable to maintain the average concentration of oxygen in the first or the combined first and second oxidizing gases above 30% during the scrap melting cycle.

When the burner/injector operates in the fuel burning mode, a controllable flow of fluid fuel is directed through the multiple openings 3 into the combustion chamber 2, and a controllable flow of a first and optionally a second oxidizing gas is directed through the respective openings 4, 8 into the combustion chamber to participate in the combustion of the hydrocarbon fuel and to create a scrap heating and melting flame directed through the combustion chamber flame discharge opening toward the scrap to be melted. When a small portion of the scrap pile located at the front of the flame discharge opening of the combustor is melted down and a larger part of the scrap located around the discharge opening is preheated to a temperature above at least 1500° F. and preferably above 1800° F., the flow of the fluid hydrocarbon fuel is reduced, and the flow of oxygen is optionally increased to create a highly oxidizing flame that rapidly reacts with preheated scrap located in front of the combustor flame discharge opening. The heat released by exothermic oxidation melts an additional portion of the scrap pile located near the combustor flame discharge opening. Then, optionally, the flow of fluid fuel is further reduced or completely eliminated, the flow of the secondary oxidizing gas (when available) is also made very low or completely eliminated, and the flow of the first oxidizing gas is further substantially increased providing for injection into the furnace, through opening 4, a high velocity oxidizing gas at a preferably supersonic velocity. The increased velocity of the first oxidizing gas allows an additional portion of preheated scrap located further away from the opening 7 of the combustion chamber to be contacted with the high velocity oxidizing stream, resulting in rapid melting of an additional scrap portion by heat released by the oxidation reaction between injected oxygen and an additional portion of preheated scrap. To provide for effective performance of the high velocity oxidizing gas, the oxygen content of this gas should be kept above 90%.

Initially melted scrap creates an iron-carbon melt that accumulates on the bottom of the furnace. In instances where a portion of the previously produced heat is not discharged from the furnace and is kept as a heel, the newly formed iron-carbon melt is mixed with the molten metal of the heel creating an additional mass of iron-carbon melt.

Figure 2:
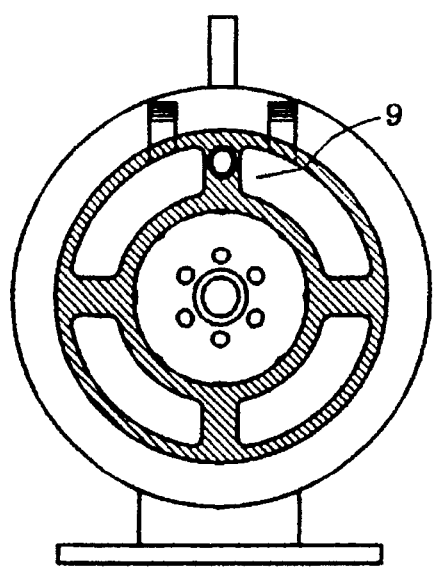
FIG. 2 shows a rear cross-sectional view of the combustor of FIG. 1, taken along line II—II of FIG. 1.

During the operating cycle of the burner/injector in the fuel burning mode, the pressurized gas, which is later used during the solid particle injection mode used as a carrier of the particles, is bled through the consumable pipe 6 to prevent flame and oxidizing gas flow penetration into the pipe. The flow of bled compressed gas also cools the pipe 6 installed into the combustor body, which is preferably made of copper. The pipe 6 is primarily cooled by the direct contact with the water cooled copper rib 9 shown in FIG. 2.

Nitrogen, compressed air, natural gas or a combination of these gases may be used as the pressurized gas carrying the particles of solid carbonaceous fuel.

Optionally, the particles of solid carbonaceous fuel can be injected to participate, together with fluid hydrocarbon fuel, in the formation of the high temperature bright melting flame during the fuel burning mode.

Also optionally, the particles of basic slag forming material (which may optionally be mixed with solid carbonaceous fuel) can be injected through pipe 6 preferably at the end of the fuel burning mode or during and after high velocity oxidizing gas injection mode.

Later, when at least a part of the scrap located at the front of the discharge opening 7 is melted down and the iron-carbon melt is created near the combustor location together with an empty space which is suitable for injection of solid particles, a combined injection mode is initiated. If the burner/injector means comprises two separate combustors, both of them could participate in the combined particles and oxidizing gas injection mode. During the combined injection mode, both combustors will preferably eliminate or reduce significantly, i.e., down to more preferably less than one-eighth, the and preferably less than one-eighth the flow of hydrocarbon fuel which was previously maintained during the operation of the burner/injector in the fuel burning mode for scrap melting purpose. The flows of the first oxidizing gas of a first combustor is also eliminated or significantly reduced down to preferably less than one-fifth the flows maintained during the scrap melting cycle. The elimination or reduction in the optionally used second oxidizing gas of both combustors is also advisable during the particle injection mode of burner/injector operation. The primary reasons for the use of the above gases during the particle injection mode are to prevent the accumulation of solid particles inside of the combustion chamber and to prevent solid particles or pressurized gas penetration throughout the openings 3,4,8 into the burner/injector body and upstream piping.

The flow of the carbonaceous fuel and/or solid basic slag forming material and the flows of compressed carrier gas are supplied through pipe 6 of the first combustor and further through the flame discharge opening 7 toward a predetermined furnace area. Approximately simultaneously, the flow of high velocity first oxidizing gas having an average oxygen content in excess of about 50% (preferably industrial produced oxygen with oxygen content exceeding 90%) is directed toward the same predetermined furnace area through opening 4 of second combustor means 1 of the burner/injector means. The high velocity oxygen stream is directed with preferably supersonic velocity to contact at least a part of carbonaceous material being injected as described above via the first combustor means to form CO which foams the slag being previously generated at said predetermined furnace area. A part of the oxygen stream will penetrate through the foamy slag and react with iron-carbon melt for refining purposes. A part of the injected carbonaceous fuel will react with iron oxides in the slag, forming CO and metallic iron. This will improve the metallic yield of the steelmaking process.

Figure 3:
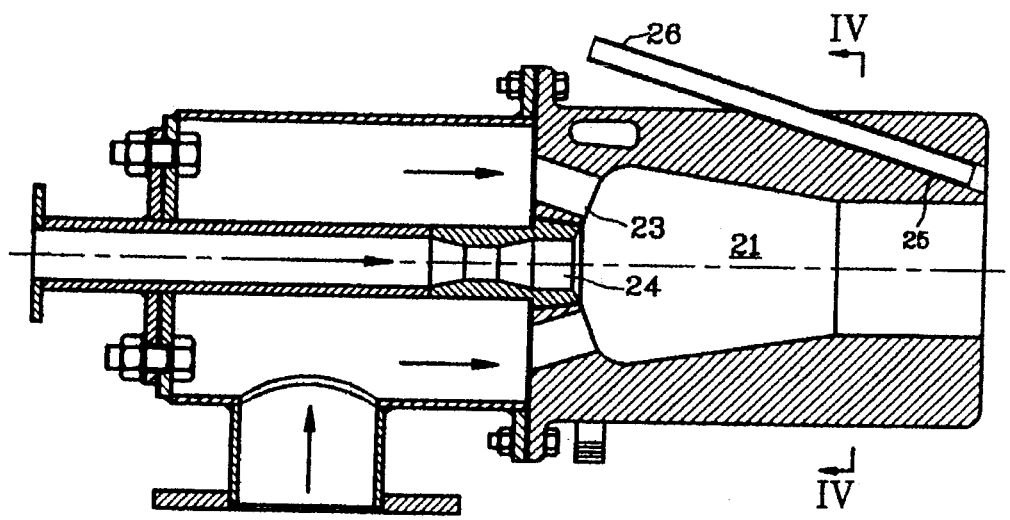
FIG. 3 shows a side cross-sectional view through the center of a second embodiment of a combustor of a burner/injector in accordance with the invention equipped with a means for injection of solid particles and additional oxidizing gas.
Figure 4:
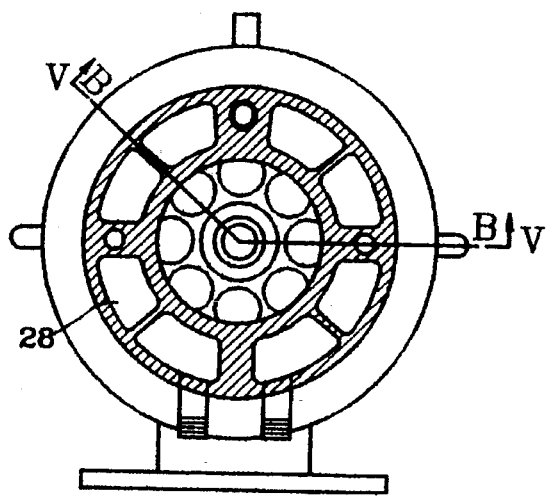
FIG. 4 shows a rear cross-sectional view of the combustor of FIG. 3, taken along Line IV—IV of FIG. 3.
Figure 5:
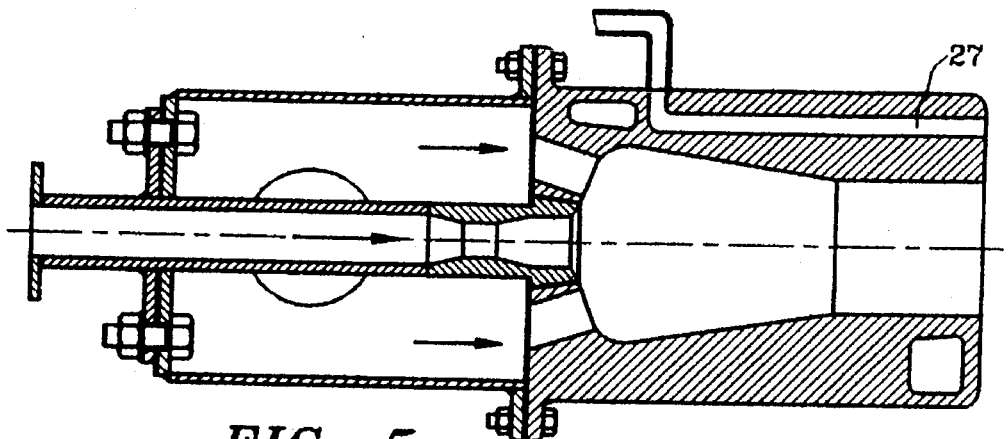
FIG. 5 shows a side cross-sectional view of the combustor of FIG. 3, taken along line V—V of FIG. 4.

The second embodiment of the invention shown in FIGS. 3, 4 and 5 relates to a burner/injector means equipped with combustor means 21 comprising multiple channels for injection of additional solid material particles and the streams of additional oxidizing gas.

The combustor means includes a water-cooled combustion chamber 22 comprising flame discharge opening 20, multiple water chambers 28, multiple openings 23 for the introduction of fluid hydrocarbon fuel into the combustion chamber 22 and an opening 24 preferably having the converging/diverging shape of a Laval nozzle for introduction of the first oxidizing gas into the combustion chamber to create the flame for melting scrap and later to inject high velocity oxygen (preferably with supersonic velocity) for oxidizing the injected solid carbonaceous fuel and iron-carbon melt.

The burner/injector means is also equipped with multiple channels 27, for injecting an additional oxidizing gas, and at least one channel 25 for injecting of solid material particles toward the furnace interior. The channel for injecting of solid particles provides for solid particle injection through the inserted replaceable pipe 26, preferably made of a highly erosion-resistant material.

The channels 27 shown in FIGS. 4 and 5 permits injection of the additional oxidizing gas to oxidize injected solid carbonaceous material and/or iron carbon melt and/or to post-combust CO. It should be understood that multiple channels (not shown in the above FIGS. 1, 2, 3, 4, and 5) for solid material particles similar to the channels 5, 25 shown in FIG. 1, FIG. 3 and multiple channels (not shown in FIGS. 1 and 2) for additional high velocity oxygen injection similar to channels 27, 28 shown in FIGS. 4 and 5 may be used by the combustors of burner/injection means utilizing one or two different oxidizing gases that are similar to the combustor embodiments shown in FIGS. 1, 2,3,4 and 5.

It should be also understood that the channel utilized for injection of the additional oxidizing gas may have the outlet opening arranged as the converging/diverging profile of a Laval nozzle to provide for supersonic velocity of injected additional oxidizing gas.

Figure 6:
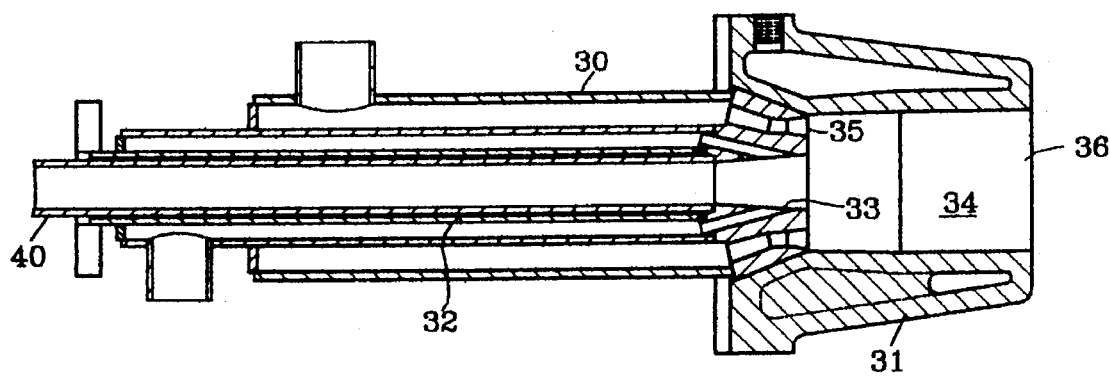
FIG. 6 shows a side cross-sectional view through the center of a third embodiment of the combustor of a burner/injector in accordance with the invention equipped with a means for injection of solid particles.
Figure 7:
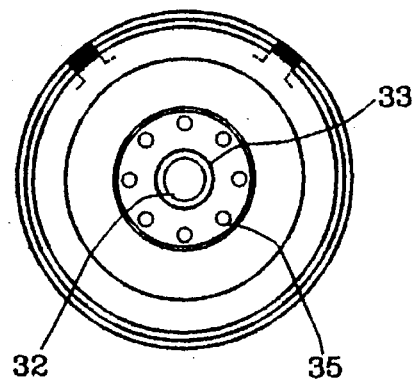
FIG. 7 shows a front view of the combustor of FIG. 6.

The third embodiment of the invention show in FIGS. 6 and 7 relates to a burner/injector means 30 equipped with combustor means 31 comprising a central channel 32 comprising a replaceable pipe 40 made of erosion resistant material and located inside of the central channel for injection of additional solid material particles, carried through the channel with the flow of compressed carrier gas, a multiple fluid hydrocarbon fuel opening 33 surrounding the central channel 32 and directing a controllable flow of the hydrocarbon fuel into a water-cooled combustion chamber 34, multiple first oxidizing gas opening 35 (preferably as shown here having the converging/diverging shape of a Laval nozzle) surrounding the central channel 32 and directing a controllable flow of highly concentrated first oxidizing gas into the water-cooled combustion chamber 34 to at least partially mix with said controllable flow of the hydrocarbon fuel inside of the combustion chamber 34 and to form a high temperature flame directed through the outlet opening of the combustion chamber 36 toward the furnace interior. The burner/injector means 30 can be equipped with (not shown in FIG. 6 and FIG. 7) additional channels for injection of additional oxidizing gas and/or solid lump of fines materials. The burn/injector means 30 may optionally comprise (not shown in FIG. 6 and FIG. 7) additional multiple openings for directing of second oxidizing gas to participate in the combustion in the water-cooled combustion chamber 34 in the manner similar to the first embodiment of the invention shown in FIG. 1.

It should be understood that multiple openings of the burner/injector means 30 introduce the hydrocarbon fuel, the first and the second oxidizing gas can exchange among them the gaseous substance which is directed toward the water-cooled combustion chamber, and the burner/injector means will still be able to operate in accordance with this invention.

When this third embodiment of the burner/injector operates injecting solid carbonaceous fines through the pipe 40 during scrap melting and refining in the furnace, the first oxidizing gas, preferably oxygen, is injected with high (optionally supersonic) velocity to at least partially burn injected carbonaceous fines. When the hydrocarbon fuel is also injected into the combustion chamber, the first oxidizing gas also participates in the combustion of this hydrocarbon fuel.

Figure 8:
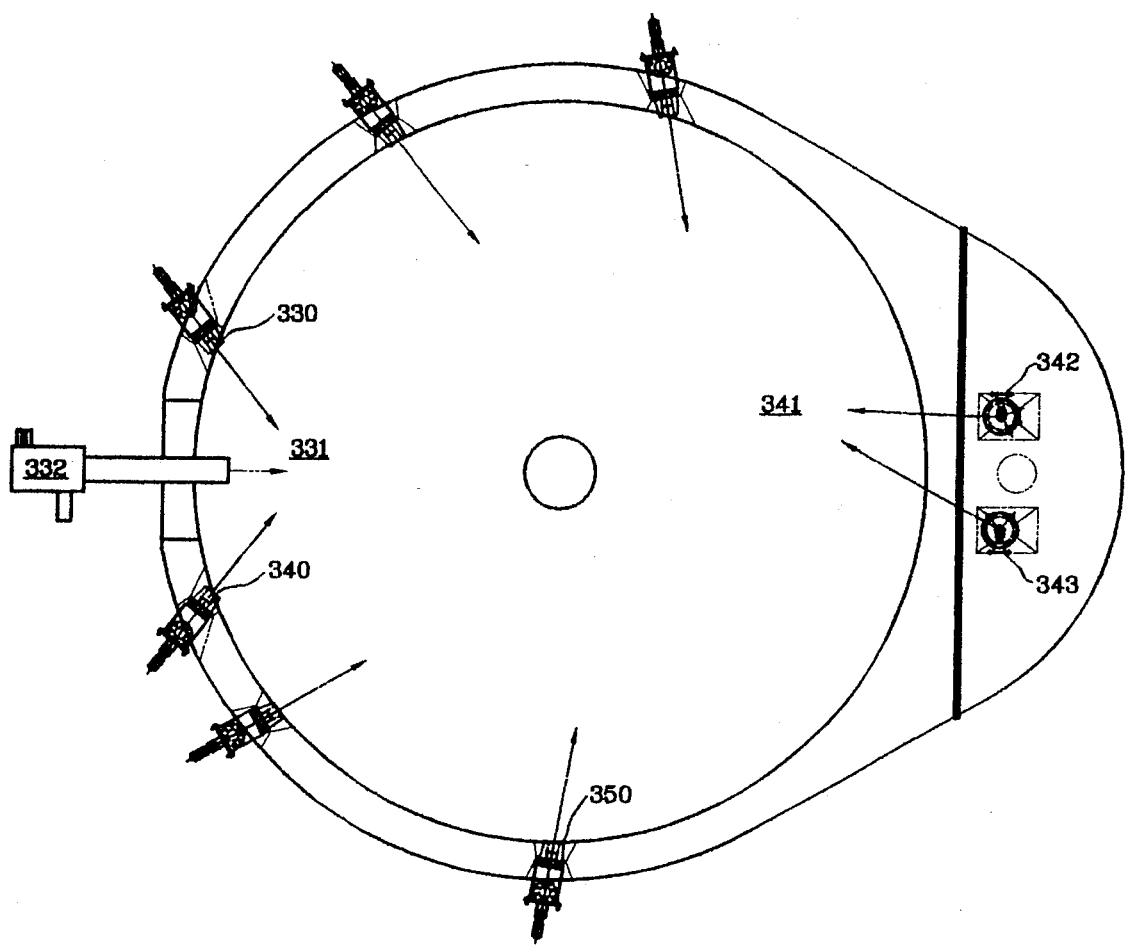
FIG. 8 shows the location in an electric arc furnace of components of multiple burner-injector means in accordance with the invention.

When an electric arc furnace using the single or multiple burner/injector means (designed as described above) operates in accordance with the invention, each burner/injector means may comprise multiple combustor means operating in cooperation with each other, wherein at least some of the combustors are equipped with the means for solid particles and/or high velocity oxygen injection. Three different arrangements of the burner/injector means installation are shown in FIG. 8, which illustrates the layout of the several combustor means in the electric arc furnace side walls. The first burner/injector means comprises two combustors 330 and 340 for carrying out the scrap melting step at the predetermined slag door area. The scrap melting step is followed with a step of solid carbonaceous fuel and additional oxygen injection, which is carried preferably simultaneously by each burner toward this predetermined area. The burner/injector means may optionally include a movable door lance 332 for injection of oxygen at least partially toward the predetermined area 331 for iron-carbon melt refining. The lance 332 may optionally include a means for injection of solid carbonaceous fuel and/or basic slag forming material. One or both combustors can be equipped with a means for injecting of basic slag forming materials toward the predetermined slag door area.

A second burner/injector means comprises two combustor means 342, 343 located at the spout area. These combustors are capable of first firing into the furnace interior toward predetermined area 341 for scrap melting purposes and then injecting toward this area 341 the combination of solid carbonaceous fuel through one of the combustor means (e.g. 342) and supersonic oxygen through the other combustor means (e.g.,343). Optionally, injection of basic slag forming material can also be carried out by one or both of combustor means 342 and 343, preferably after some, and more preferably after a substantial amount of carbon and oxygen has already been injected by these combustor means.

The third burner/injector means 350 utilizes a single combustor means for melting scrap and for the combined injection of high velocity oxidizing gas and at least one type of solid material particles such as carbonaceous fuel, basic slag forming material, or electric arc furnace dust for recycling, etc, or any combination of these materials. The burner/injector 350 can be used for the dedicated purpose of rapid slag forming around the arc. The combustor is permanently installed at hot spot area, so that the arc and the combustor very rapidly melt the scrap located in the predetermined area 351 between electrode and the combustor. The combined carbon and oxygen injection is initiated very earlier prior to the occurrence of substantial scrap melting at cold spots including the cold spots 331, 341 where the other burner/injector means are operated. It should be understood that electric arc furnace dust (or other solid particles) can also be injected through any combustor equipped with the means for injecting of solid particles shown in FIG. 8 and/or through the door lance 332. It should also be understood that any and all the above combustors and/or the movable door lance 332 can be equipped with means for injection of additional oxidizing gas for post-combustion of CO inside the furnace.

It is important for post-combustion of CO inside the electric arc furnace to inject additional oxygen toward predetermined areas affected by burner/injector means where CO is predominantly generated, to increase the efficiency of CO post-combustion. It is therefore advisable to equip the combustion control system responsible for controlling the flows of hydrocarbon fuel, solid carbonaceous fuel, the first oxidizing gas and optionally the second oxidizing gas to communicate with the kWh meter of the furnace to acquire information about the electrical energy input and to use this information together with other process information related to the heat of combustion and oxidation being introduced by burner/injector means. The control system should use the cumulative energy input to continually optimize flame characteristics throughout the melt down cycle, including the injection of oxygen by the combustors to cut heavy scrap when such an optional technique is utilized to rapidly create an empty space in front of the combustors. The acquired data should preferably be used to establish an appropriate time at which the combined injection of carbonaceous fuel and oxygen, and optionally, the injection of basic slag forming material and/or electric arc dust should be initiated.

When the electric arc furnace operates without the heel containing the molten metal retained from the previous heat, it is advisable to delay the combined carbonaceous fuel and oxidizing gas injection until sufficient iron-carbon melt and slag is formed in the furnace. For a burner/injector means located at the hot spot area, it is advisable to delay the combined injection until at least 100 kwh is introduced into the furnace by the electric arc and the combustors per ton of charged solid ferrous metallic materials. The burner/injector means located at the cold spots should delay the combined injection until at least 150 kwh is introduced to the electric arc and the combustors per ton of charged solid ferrous metallic. When the electric arc operates with the molten heel the delay should be reduced or completely eliminated.

It is also desirable to equip the electric arc furnace with a control system capable of simultaneously acquiring data on the amount of electric energy introduced by electrode(s), the natural gas combustion energy introduced by the combustors, and the chemical energy being introduced by injected oxidizing gas and carbonaceous fuel. This data should be used to stage the time of post-combustion oxygen injection so that the amount of CO generated inside the electric arc furnace is post-combusted prior to the exhaust gases leaving the furnace, so that the maximum percentage of exothermic heat which has been released inside the furnace is actually transferred to the scrap and the iron-carbon melt.

Additionally, while the invention has been discussed with fuel and oxidizing gases being introduced in the combustion chamber of the burner/injector means through their respectively identified openings, it should be understood that the fuel and the first and second oxidizing gas supplies may be interchanged and the burner/injector means will still be able to function.

While this invention describes the use of burner/injectors for EAF as steelmaking process, it should be understood that other metal producing processes utilizing burners can be improved by the use of the burner/injector methods and apparatuses that have been described herein. While the invention has been disclosed with burner/injectors utilizing combustors equipped with means for solid carbonaceous material and additional high velocity oxygen injecting, it should be understood that it is not necessary for all involved combustors to be equipped with such injecting means and that when at least one combustor provides for carbon injecting means, the invention will be still able to function as soon as means are provided for high velocity oxygen injection toward the same predetermined area where carbonaceous material is also provided. Similarly, it is enough to provide a single combustor equipped with solid particle injection means to be able to carry the staged injection of several flows of different solid particles or inject a mixture of solid carbonaceous fuel and/or basic slag forming material and/or EAF dust and/or other solid particles.

While this invention describes the use of the burner/ injector utilizing a preferred sequence and preferred combination of material flows simultaneously introduced by the burners, it should be understood that other firing and introduction sequences and combinations of materials flows can be used during the steelmaking process and the burner/ injector means will still be able to function. For example, it can be beneficial in some cases to inject solid particles (carbonaceous fuel, basic slag forming material and others) through the flame formed by the burner injector means during the entire steelmaking cycle or during the majority of the steel making cycle.

Figure 9:
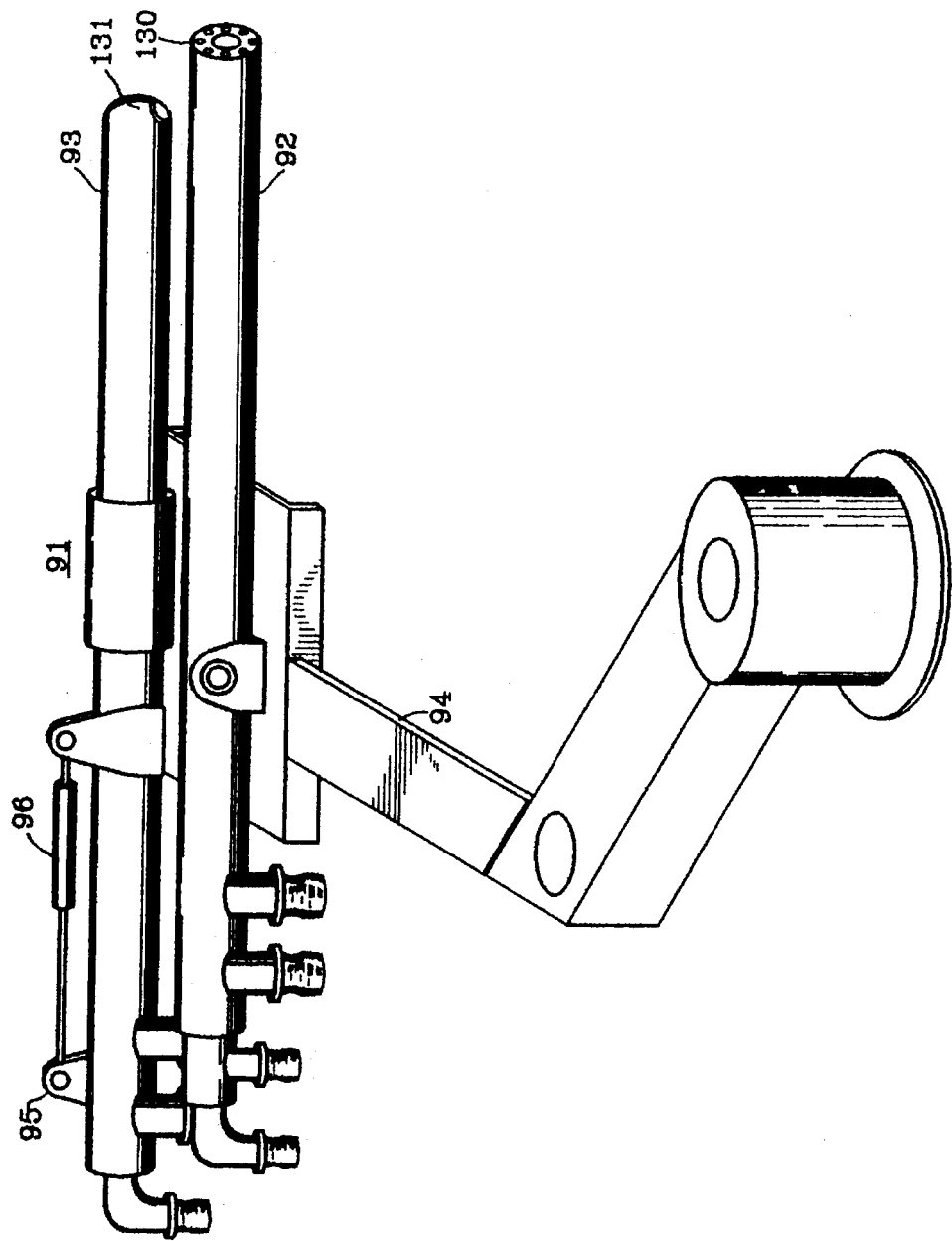
FIG. 9 shows a schematic of a fourth embodiment of a burner/injector means in accordance with the invention for operating through the slag door of the furnace.

The fourth embodiment of the invention shown in FIG. 9 relates to a burner/injector means designed to operate preferably through the slag door opening. As shown in FIG. 9, this burner/injector means 91 comprises two movable water-cooled lances 92 and 93 supported by a main movable arm 94 capable of moving the lances from idling storage position in which operating ends of both lances are located outside the furnace to several operating positions in which the operating ends of the lances 130 and 131 are located in front or inside of the slag door opening. An additional auxiliary movable arm 95 is attached to at least one of the lances to provide relative movement forward and back along the arm 94 of the attached lance relative to the other lance. This auxiliary arm movement is used to move the operating end of one lance in front of the operating end of the other lance by the use of actuator 96.

The first of the two lances is a burner lance 92 shown in FIGS. 10 and 11. The burner lance comprises an outer water-cooled pipe 97, an inner water-cooled pipe 98, a partitioning water-cooled pipe 99, a first oxidizing gas supply conduit 100 formed between the inner water-cooled pipe and oxidizing gas inner pipe 101, a fluid hydrocarbon fuel supply conduit 102 formed between the oxidizing gas inner pipe and a fluid fuel inner pipe 103, a consumable pipe 104 made of erosion-resistant material for introduction into the furnace of solid fines (solid carbonaceous fuel, lime, dolomite, EAF dust, etc.) carried with compressed carrier gas (compressed air, nitrogen, etc.), multiple holes 105 for discharging of fluid hydrocarbon fuel, multiple holes 106 for discharging of a first oxygen rich oxidizing gas (oxygen, oxygen enriched air, etc.) wherein the holes 105 and 106 allow for the discharging and mixing of the discharged fuels and the first oxidizing gas in order to form a high temperature flame at the operating end 130 of the first lance and wherein compressed carrier gas can be discharged with or without solid carbonaceous fuel (for example, coal) fines and/or other solid fines throughout an open end 64 of the pipe 104 when the compressed gas is discharged with solid fines, this gas directs the flows of the discharged materials along the central axis of the high temperature flame, so that these flows of solid fines and carrier gas can at least partially participate in mixing and combustion together with the first oxidizing gas stream.

The first lance also comprises a fluid hydrocarbon fuel inlet 107 communicating with the supply conduit 102, a first oxidizing gas inlet 108 communicating with the supply conduit 100, a cooling water inlet 109 and a cooling water outlet 110 communicating with the water-cooling system of the lance formed by water-cooled pipes 97, 98 and 99, a compressed carrier gas and solid fines supply inlet 111 communicating with consumable pipe 104.

The second lance 93 of these two lances is the oxygen injecting lance and is used mainly for the purpose of iron-carbon melt refining. The lance 93 is shown in FIGS. 12 and. This oxygen injecting lance consists of an outer water-cooled pipe 121, an inner water-cooled pipe 122, a partitioning water-cooled pipe 123, an additional oxidizing gas (preferably high pressure oxygen) supply conduit 124 formed inside the inner water-cooled pipe and an oxidizing gas discharge nozzle 125 having at least one opening 126 capable of discharging high velocity (preferably supersonic) stream or streams of the additional oxidizing gas angled down so that it is capable of impinging the melt inside the EAF at an angle of approximately 35°–55° and preferably 42°–48°, when the additional oxidizing gas stream or streams are discharged from the lance which is positioned horizontally or inclined toward the surface of the molten bath inside the EAF.

The second lance also comprises a cooling water inlet 127 and a cooling water outlet 128 communicating with the water-cooling system of the lance formed by water-cooled pipes 121, 122, and 123. Optionally, the lance 93 can be equipped with multiple discharging holes (not shown in FIGS. 12 and 13) for a secondary additional oxidizing gas injection, which can be used for the purpose of post-combustion of CO which is formed by the carbon oxidation reactions involving the additional oxidizing gas.

When an electric arc furnace using the fourth embodiment of the burner/injector means (designed as described above) operates in accordance with the invention, the burner lance 92 initially fires through the at least partially open slag door to preheat and to melt a light portion of scrap located at the slag door during the initial stage of scrap melting.

During this initial stage, the burner lance of the burner/injector means utilizes fluid hydrocarbon fuel and the first oxygen rich oxidizing gas is delivered, respectively, to the burner inlets 107 and 108. Advisably, the compressed carrier gas (preferably air) is simultaneously delivered to inlet 111. After the delivered gases are discharged through their respective discharge nozzles and openings, they are mixed and ignited, forming a high velocity flame at the operating end 130. Prior to ignition, the burner lance operating end 130 is positioned by the movable arm 94 in front of the at least partially open slag door, so that the operating end faces the scrap pile through the at least partially open slag door, and so that the flame impinges the scrap located at the door and preheats the contacted scrap. Optionally, arm 94 can provide for spanning of operating end 130 so that the flame impinges a majority of the scrap pile accessible for the flame impingement through the slag door opening.

After at least a part of the scrap pile contacted by the flame is preheated to above at least 1400° F., it is advisable to initiate the delivery of carbonaceous fuel fines with the flow the compressed carrier gas through the pipe 104, so that carbonaceous fuel fines at least partially participate in the combustion inside of the flame envelope by mixing with oxygen delivered with the first oxidizing gas. It is advisable to at least partially reduce the flow of hydrocarbon fuel and/or to increase at least partially the flow of the first oxidizing gas to make an additional amount of oxidizing gas available for at least partial oxidation of solid carbonaceous fuel. This carbonaceous fuel fine injection provides for increased flame temperature and generation of hot CO formed by partial oxidation of the injected carbonaceous fuel. This allows for the protection of the hot scrap from excessive oxidation by the flame and ambient air inspirated through the at least partially open slag door. The rest of the carbonaceous fuel injected by the burner lance accumulates inside of the scrap pile where this fuel is continuing to be oxidized with oxygen.

To speed the melting of scrap located at the slag door, it is advisable in many cases to cut pre-heated scrap during and/or preferably at the end of the scrap melting cycle. In such a case, when at least a part of the scrap pile located at the open slag door has been preheated to at least 1700° F., it is advisable to substantially reduce the flow of hydrocarbon fuel and optionally to increase the flow of first oxidizing gas (optionally up to the speed of sound or above) so that preferably at least 30% and more preferably at least 50% of excess (above stoichiometric combustion amount) oxygen is supplied with the flame to cut the preheated scrap pile. Optionally, the entire flow of hydrocarbon fuel can be terminated or reduced to a very low flow. It is advisable in many cases to continue the solid carbonaceous fuel injection during this period of scrap cutting. When the above scrap cutting cycle is used, a portion of preheated scrap will be oxidized by the excess oxygen. Oxidation of light scrap forms a high temperature light scrap burning zone which radiates and rapidly melts the scrap surrounding the scrap burning zone. The heavy scrap pieces contacted by oxygen will be cut and submerged. During the above-described stages of scrap melting and/or cutting near the slag door, the operating end 130 of the burner lance should be positioned preferably at least several inches in front of the second oxygen injecting lance operating end 131.

When scrap located at the slag door is at least partially melted and optionally cut, so that adequate space is cleared for introduction of the lances into the slag door without hitting scrap pieces, the lance supporting arm 94 moves both lances toward the furnace interior through the slag door opening. Prior to or simultaneously with this movement, the auxiliary arm 95 moves one of the lances so that the second oxygen injecting lance moves forward or the first burner lance moves back along the supporting arm 94, so that the operating end 13 1 of the second lance moves forward so that it is at least 6–18 inches ahead of the burner lance operating end 130. The new position of the supporting arm should preferably be chosen to ensure that high velocity flow of the additional oxidizing gas is injected through the nozzle toward the melt located inside of the furnace and is directed to impinge the metallic melt surface at a spot located at least 6 inches and preferably at least 10 inches away from the refractory bank of the furnace.

Either shortly before or immediately after the lances are moved into this new position, the additional flow of oxidizing gas is initiated by the oxygen injecting lance. The objective of this mode of burner/injector means operation is to form foamy slag on the iron-carbon melt surface located near the slag door. The pressure and flow of this additional oxidizing gas is maintained to provide for preferably subsonic discharging velocity, and the flows of the hydrocarbon fuel, the first oxidizing gas and the solid carbonaceous fuel are preferably adjusted so that the flow of the first oxidizing gas is only capable of complete combustion of less than 75% and preferably less than 50% of instantly injected carbonaceous fuels. Optionally, the flow of hydrocarbon fuel during this period of time is terminated or is greatly reduced so that less than 30% and preferably less than 20% of the total oxygen being introduced with the first oxidizing gas is sufficient to complete oxidation of the hydrocarbon fuel flow.

When the flow of hydrocarbon fuel is maintained, the first oxidizing gas is partially consumed by combustion and hot combustion products are mixed with a remaining portion of the first oxidizing gas. This raises the temperature of the remaining portion of the oxidizing gas and accelerates the oxidation reactions in which this remaining oxygen participates. In addition, the reduced flow of hydrocarbon fuel still protects the holes 105 from plugging with foamy slag.

During this stage of furnace operation, a part of the injected solid carbonaceous fuel is able to reach the surface of the iron-carbon melt which is accumulated on the bottom of the furnace near the slag door. Here these fines are mixed with the slag layer formed on the top of the iron-carbon melt. Part of the additional oxidizing gas directed down toward the melt penetrates the slag layer and contacts this melt. Solid carbonaceous fuel react, with oxides present in the slag and with the additional oxidizing gas contacting the slag layer and forms hot CO which is emitted through the slag layer making a foamy slag. CO is also generated by oxidation of carbon in the melt via reactions with the additional oxidizing gas and slag oxides. When CO is exhausted from the slag, it mixes with the flow of the first oxidizing gas which is preferably provided above the area where CO is mainly generated by the reactions involving the additional oxidizing gas.

The orientation and direction of the holes discharging the first and the additional oxidizing gases should be arranged to maximize the mixing and the post-combustion of the CO with the flow of the oxidizing gases during the foamy slag forming stage of scrap melting. The operation of both lances in the above-described manner with this mode of slag foaming is continued until additional scrap (located further away from the slag door) is melted by the arc (which is now submerged into the foamy slag) and by exothermic oxidation reactions maintained with the flow of the oxidizing gases injected by the burner/injector means. Optionally, when the oxygen injecting lance is equipped with the secondary additional oxidizing gas injecting means, the flow of the secondary additional oxidizing gas can be directed to participate in the CO post-combustion instead of or together with the first oxidizing gas.

After scrap located at least one foot and preferably at least two feet behind the slag door is melted down, the supporting arm moves the lances further inside of the furnace interior so that the new positions of the operating ends of the lances are established. The new position of the second lance provides an additional oxidizing gas impinging spot positioned at least 18 inches and preferably at least 24 inches away from the refractory bank of the furnace. After the burner/injector means lances are moved into this new position, a melt refining cycle can be initiated. During the melt refining cycle, the flow of the additional oxidizing gas is increased (and optionally, the flow of the secondary additional oxidizing gas is also increased) to provide a jet or jets of preferably supersonic velocity which are introduced through the discharging hole or plurality of holes of the oxygen injecting lance to ensure a desired rate of melt refining. It is advisable to maintain the reduced flow of fluid hydrocarbon fuel to protect the discharging holes 105 from foamy slag plugging during the melt refining.

During this mode of operation, the other burner means optionally operating through the furnace side walls may change the firing stoichiometry and provide an extra amount of oxygen, so that the total amount of oxygen injected by the side burners and by slag door burner/injector means exceeds the total amount of oxygen instantly needed to convert at least a majority of the instantly emitted CO inside of the furnace into $CO_2$.

This mode of rapid melt refining can be also optionally assisted by additional oxygen injecting lances providing additional oxygen for melt refining and/or CO post-combustion inside the furnace and/or CO post-combustion in the exhaust gases downstream of the furnace.

To improve slag foaming during the final part of the steelmaking the flow of burnt or dolomitic lime or the flow of raw dolomite particles and/or limestone can be injected into the furnace through this lance and/or through other burner/injector means, and/or by another means to increase slag basicity and to reduce slag temperature. This will result in improvement of the slag's ability to stay foamy and reduce the equilibrium amount of oxygen dissolved in the steel.

Optionally, a fifth embodiment of the burner/injector means may also operate in the combustion chamber responsible for the final post-combustion of CO and hydrocarbon emitted from the EAF. This post-combustion burner injector means should use oxygen rich oxidizing gas in order to minimize an additional amount of combustion products contributed by the burners and to later be treated at the baghouse downstream of the combustion chamber. Oxygen rich oxidizing gas can be comprised of purchased oxygen and/or a combination of purchased oxygen and air. The use of oxidizing gas with higher than air oxygen content increases the amount of heat being released per standard cubic feet of the newly formed combustion products and at the same time increases the temperature of the flame introduced in the combustion chamber.

During the final stage of the steel making cycle, the flue gases entering the combustion chamber have a very high temperature above 2000° F. and often above 2500° F. Oxygen rich flames introduced under such conditions have the temperature of the flame core higher than 4000° F. and more likely higher than 4500° F. These conditions provide for rapid NO generation when combustion products containing a substantial amount of nitrogen are inspirated inside of the flame envelope containing highly concentrated oxygen. To minimize additional $NO_x$ generation under such conditions, the cooling agent such as sprayed water or steam may be introduced inside the flame. The introduction of water is also needed to create conditions to enhance CO post-combustion in the exhaust gases passing through the combustion chamber. During the final stages of steelmaking, the $H_2O$ content in combustion products is greatly reduced due to the low firing rate of the burners in the EAF and to the relatively small amount of water contained in the inspirated ambient air downstream of the furnace. The kinetics of CO post-combustion can be described with the kinetic expression for the rate of change of CO mole fraction ($f_{CO}$) with time $$\frac{df_{CO}}{dt} = 1.8 \times 10^{13} f_{CO} f_{O2}^{0.5} f_{H2O}^{0.5} \left(\frac{P}{R'T}\right) \exp\left(-\frac{25000}{RT}\right)$$

where $f_{CO}$, $f_{O2}$, $f_{H2O}$— are the mole fractions of CO, $O_2$ and water vapor respectively, T is absolute temperature in degrees Kelvin, P is absolute pressure in atmospheres, t is time in seconds, R is the gas constant=1.986 Kcal/Kgmol °K., and R' is the gas constant in alternative units 82.06 atm cm³/gmole °K.

This reaction shows dependency of the rate of CO post-combustion on the $H_2O$ concentration. Therefore, to improve CO post-combustion, it is desirable to burn hydrocarbon fuel to form $H_2O$ during CO post-combustion inside the furnace. It is also desirable in many cases to introduce $H_2O$ in the post-combustion chamber when the exhaust temperature is substantially above the CO ignition point.

It is important to understand that the equation describes the kinetic energy assuming that the temperature of all reacting molecules is the same. The preheating of injected water and/or steam to the temperature of exhaust gases takes time. Until preheating is achieved, the rate of reaction is low due to low temperature of $H_2O$ molecules and so, therefore, is the level of kinetic energy of $H_2O$ molecules.

Spraying water through the hottest zone of the hot oxygen rich flame will simultaneously accomplish two functions: first, to preheat the water entering the combustion chamber (this will speed CO post-combustion reactions), and second to cool the flame hot zone by using the heat released in this zone for heating, volatizing and superheating of injected water.

Figure 14:
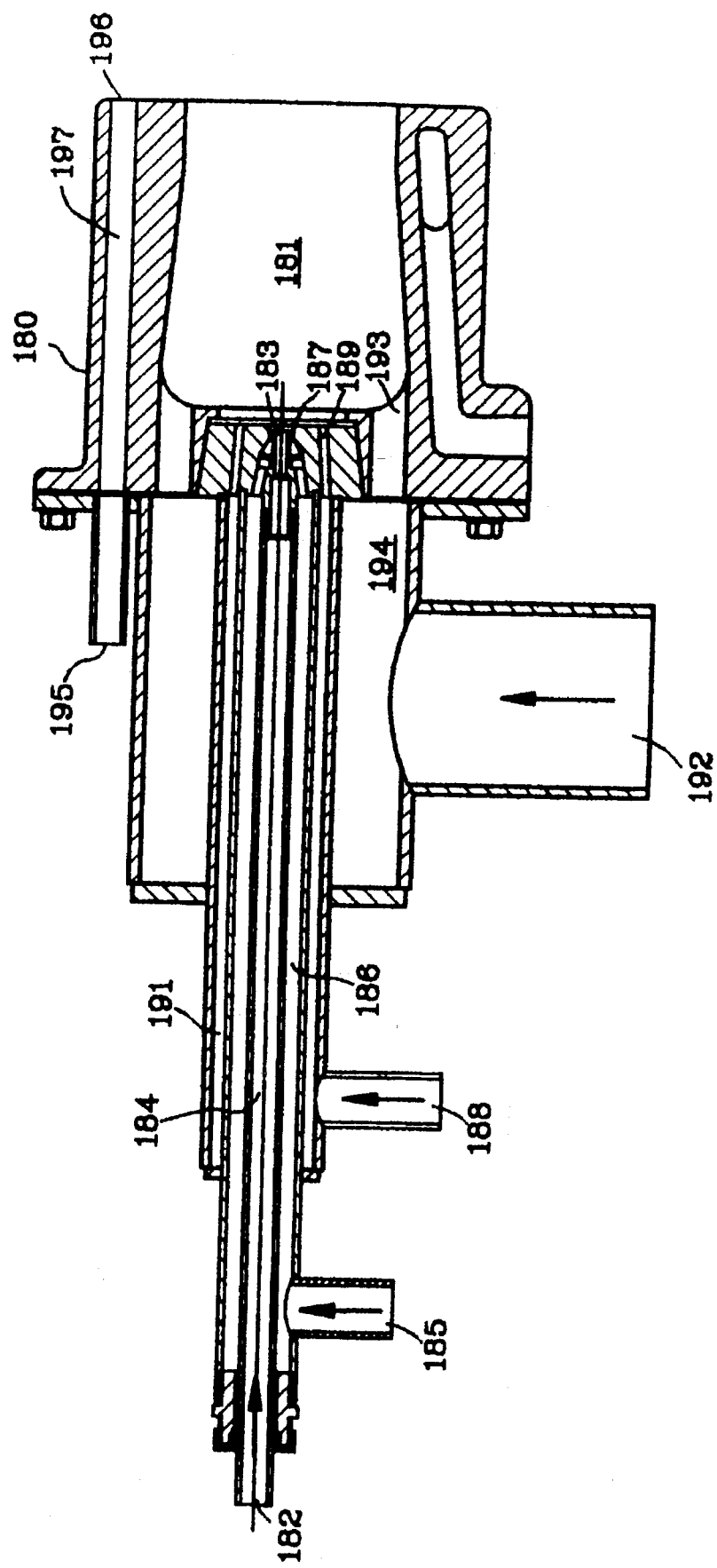
FIG. 14 shows a side cross-sectional view through the center of a fifth embodiment of a combustor of a burner/injector means in accordance with the invention which is designed for operating at the combustion chamber of the electric arc furnace.

The fifth embodiment of the burner/injector means 180 (shown in FIG. 14) allows for the use of oxygen rich oxidizing gas and is equipped with an oxygen/water spraying nozzle. The burner/injector means is comprised of a water-cooled combustion chamber 181, a water inlet 182 communicating with a water outlet opening 183 by a water delivery pipe 184, a first oxygen rich oxidizing gas inlet 185 communicating with the first oxidizing gas outlet slot 187 by a first oxidizing gas delivery conduit 186, a fluid fuel inlet 188 communicating with multiple fuel outlet holes 189 by fuel delivery conduit 191, an optional second oxidizing gas inlet 192 communicating with optional multiple second oxidizing gas outlet holes 193 by an optional second oxidizing gas delivery conduit 194. The dimensions of the slot 187 and the water outlet opening 183 provide for the atomization of water discharged into the combustion chamber.

Optionally, the burner/injector means is further comprised of an additional oxidizing gas inlet 195 communicating with at least one outlet opening 196 by the additional oxidizing gas conduit 197. When the burner 180 operates during the earlier stage of scrap melting to maintain the temperature in the combustion chamber down stream of the furnace above the temperature needed for reliable CO ignition and rapid burning, the fuel and at least the first oxidizing gas are supplied and mixed in the combustion chamber 181 generating a high temperature flame. The water stream can be optionally supplied and atomized in the combustion chamber suppressing $NO_x$ formation. Later, when the temperature of the exhaust gases entering the combustion chamber exceeds the temperature of reliable CO ignition and the computerized burner control system or operator determines the need for supplying additional oxygen into the combustion chamber for CO post-combustion purposes, the flow of fuel is substantially reduced and preferably completely eliminated and the flow of the additional oxygen supplied with at least the first oxidizing gas (and optionally with the second and with an additional oxidizing gas to maximize the total oxygen volume and the mixing efficiency) is increased to provide for above stoichiometric conditions for CO post-combustion in the exhaust furnace gases passing through the furnace combustion chamber. The flow of the water injected during this period of time is also predetermined by the burner control system and is preferably used to increase the speed of CO post-combustion and to inhibit $NO_x$ formation in the hot post-combustion reaction zone.

Finally, while this invention has been described in detail with particular reference to preferred embodiment thereof, it will be understood that variations and modifications can be effected within the spirit and scope of this invention as previously defined and as defined in the claims.

What is claimed:

1. A method of steelmaking carried out in an electric arc furnace, comprising the steps of:
    a) heating the furnace using an electric arc;
    b) directing, through at least one burner/injector means, controllable flows of hydrocarbon fuel and a first oxidizing gas having an average oxygen content in excess of 30% to mix and to create a high velocity impinging flame directed toward a portion of scrap located at a desired area of the furnace in front of a flame discharge opening of the burner/injector means;
    c) maintaining the controllable flows of hydrocarbon fuel and the first oxidizing gas until a portion of scrap located at the desired area of the furnace is at least partially melted, thereby creating an iron-carbon melt and a slag layer covering the iron-carbon melt;
    d) then introducing, through the burner/injector means, a stream of solid particles of carbonaceous fuel carried by a compressed carrier gas toward the desired area of the furnace; and
    e) introducing, approximately simultaneously with the introduction of the solid carbonaceous fuel, a flow of a high velocity additional oxidizing gas having an average oxygen content in excess of 80% toward the iron-carbon melt at the desired area of the furnace previously occupied by scrap that has been at least partially melted, wherein the additional oxidizing gas at least partially reacts with the iron-carbon melt and the solid particles of carbonaceous fuel to create a stream of hot CO which is further at least partially oxidized to $CO_2$ and exhausted with other flue gases from the furnace.

2. The method of claim 1, wherein the desired area of the furnace is near an at least partially opened slag discharge door of the furnace.

3. The method of claim 1, wherein the solid carbonaceous fuel and the additional oxidizing gas are both directed to the desired area of the furnace.

4. The method of claim 3, wherein the solid carbonaceous fuel is mixed with and burned by the first oxidizing gas, thereby creating a highly luminous flame that is directed through the discharge opening of the burner/injector means.

5. The method of claim 4, wherein the hydrocarbon fuel also participates in the formation of the highly luminous flame.

6. The method of claim 1, wherein the first oxidizing gas is directed above the iron-carbon melt reacting with the additional oxidizing gas, wherein the first oxidizing gas participates in the oxidization of CO to $CO_2$ at least partially inside the interior of the furnace.

7. The method of claim 1, wherein the flow of hydrocarbon fuel is reduced after the scrap in the furnace is substantially melted down, wherein the hydrocarbon fuel and the first oxidizing gas form a small flame envelope exiting the flame discharge opening of said burner/injector means to protect said flame discharge opening from plugging with slag.

8. The method of claim 1, in which the additional oxidizing gas has an average oxygen content in excess of 90%.

9. The method of claim 1, wherein the additional oxidizing gas is introduced simultaneously with the introduction of the first oxidizing gas by the combustor means of said burner/injector to post-combust CO at least partially inside the interior of the furnace.

10. The method of claim 1, wherein the controllable flows of hydrocarbon fuel and first oxidizing gas are initially maintained to provide the oxygen to fuel ratio near the stoichiometric combustion ratio and later are charged to provide excess oxygen to cut preheated scrap, and wherein the excess oxygen is further provided during the introduction of solid particles of carbonaceous fuel to oxidize the particles of carbonaceous fuel and to oxidize CO generated by the oxidation of these particles.

11. The method of claim 10, wherein the flow of hydrocarbon fuel is terminated during a part of the time when excess oxygen is provided by the first oxidizing gas flow.

12. The method of claim 1, wherein solid particles of carbonaceous fuel are introduced into the high velocity impinging flame where the particles of carbonaceous fuel are partially oxidized by the first oxidizing gas.

13. The method of claim 1, wherein at least part of the hot CO stream is generated under the slag layer formed on top of the iron-carbon melt to penetrate through the slag, thereby forming foamy slag.

14. The method of claim 1, wherein at least part of the CO stream is generated inside the slag layer formed on top of the iron-carbon melt to form foamy slag.

15. The method of claim 1, wherein the carbonaceous fuel deposits on top of a slag containing iron oxides formed on top of the iron-carbon melt, wherein the carbonaceous fuel at least partially reacts with the iron oxides to form CO and molten iron.

16. The method of claim 1, further comprising the step of introducing a stream of basic slag forming material to increase basicity of the slag created on the top of said iron-carbon melt.

17. The method of claim 1, further comprising the step of introducing a stream of basic slag forming material to increase basicity of the slag created on the top of said iron-carbon melt after at least a part of the solid carbonaceous fuel has been introduced into the furnace.

18. The method of claim 1, wherein the first high velocity oxidizing gas is introduced by means of injecting oxygen located inside of the burner/injector means.

19. The method of claim 1, wherein the first oxidizing gas comprises two different oxidizing gases having different oxygen concentrations.

20. The method of claim 19, wherein the high velocity first oxidizing gas has an average oxygen content in excess of 90%.

21. The method of claim 1, in which the flow of the high velocity additional oxidizing gas is introduced at least a part of the steelmaking cycle with supersonic velocity.

22. The method of claim 1, in which the flow of the first oxidizing gas is introduced at least a part of the steelmaking cycle with supersonic velocity.

23. The method of claim 16, the basic slag forming material is one of coal, coke basic slag forming materials, electric arc furnace dust, direct reduced iron, iron carbide or a mixture thereof.

24. The method of claim 1, wherein said step of introducing solid particles of carbonaceous fuel is initiated after a desired amount of heat has been introduced into the furnace by an electric arc in combination with at least one auxiliary heat source.

25. A method of making steel in an electric arc furnace having a slag discharge door and a steel tapping area, comprising the steps of:

a) heating the furnace using an electric arc;

b) introducing a plurality of flames each formed by burning a fluid hydrocarbon fuel and a first oxidizing gas and directing the flames each toward desired areas of the furnace occupied by charged scrap;

c) maintaining the plurality of flames until the scrap located in the desired areas are at least partially melted, thereby creating an iron-carbon melt and a slag layer covering the iron-carbon melt;

d) injecting a first flow of solid carbonaceous fuel carried by a compressed carrier gas into the furnace and simultaneously injecting a flow of the first oxidizing gas to mix with and at least partially oxidize the injected solid carbonaceous fuel, the injection being carded out into a region adjacent the slag discharge door of the furnace; and e) injecting a second flow of solid carbonaceous fuel carded by a compressed carrier gas into the furnace and simultaneously injecting a second flow of the first oxidizing gas to mix with and at least partially oxidize the injected solid carbonaceous fuel, the injection of the second flow of solid carbonaceous fuel and first oxidizing gas are directed into a region adjacent to the steel tapping opening of the furnace.

26. The method of claim 25, further comprising the step of injecting a third flow of solid carbonaceous fuel carried by a compressed carrier gas and simultaneously injecting a third flow of the first oxidizing gas to mix with and at least partially oxidize the injected solid carbonaceous fuel, the injection of the third flow of the solid carbonaceous fuel and first oxidizing gas are directed into an area in which an electric arc is providing a higher electrical energy input rate per ton of charged scrap than at the location of other areas of injection of the other flows.

27. The method of claim 26, in which the injection of the third flow of the solid carbonaceous fuel and first oxidizing gas is initiated prior to the injection of the first and second flows of the first oxidizing gas to accelerate the establishment of a slag layer surrounding the electric arc.

28. The method of claim 25, further comprising the step of injecting a flow of an additional oxidizing gas toward the iron-carbon melt to at least partially oxidize the melt.

29. The method of claim 28, in which the step of injecting the additional oxidizing gas is also directed to mix with and at least partially oxidize the injected solid carbonaceous fuel to accelerate the establishment of a foamy slag layer disposed on the top of the iron-carbon melt.

30. The method of claim 28, in which at least one burner/injector means capable of injecting solid carbonaceous fuel injects the additional oxidizing gas.

31. The method of claim 25, in which the injection of the second flow of solid carbonaceous fuel and the second flow of the first oxidizing gas are initiated prior to the injection of the first flow of solid carbonaceous fuel.

32. The method of claim 25, further comprising the step of injecting basic slag forming material.

33. The method of claim 25, and further comprising the step of recycling electric arc furnace dust by injecting the electric arc furnace dust by a carrier gas.

* * * * *